United States Patent
Karlssøn

(10) Patent No.: US 7,967,332 B2
(45) Date of Patent: Jun. 28, 2011

(54) SIDE CURTAIN AIRBAG

(75) Inventor: David Karlssøn, Lund (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/518,462

(22) PCT Filed: Dec. 12, 2007

(86) PCT No.: PCT/EP2007/010847
§ 371 (c)(1),
(2), (4) Date: Jun. 10, 2009

(87) PCT Pub. No.: WO2008/077485
PCT Pub. Date: Jul. 3, 2008

(65) Prior Publication Data
US 2010/0013198 A1 Jan. 21, 2010

(30) Foreign Application Priority Data

Dec. 21, 2006 (DE) .................. 10 2006 061 968

(51) Int. Cl.
*B60R 21/213* (2011.01)
(52) U.S. Cl. .................. 280/730.2; 280/728.2
(58) Field of Classification Search .............. 280/730.2, 280/728.2
See application file for complete search history.

(56) References Cited

U.S. PATENT DOCUMENTS

| | | | |
|---|---|---|---|
| 6,371,512 B1 * | 4/2002 | Asano et al. ............... | 280/730.2 |
| 6,450,529 B1 * | 9/2002 | Kalandek et al. ......... | 280/730.2 |
| 6,481,743 B1 | 11/2002 | Tobe et al. | |
| 6,808,199 B2 * | 10/2004 | Saderholm et al. ........ | 280/730.2 |
| 6,830,262 B2 * | 12/2004 | Sonnenberg et al. ...... | 280/730.2 |
| 7,401,805 B2 * | 7/2008 | Coon et al. ................ | 280/730.2 |
| 7,661,705 B2 * | 2/2010 | Jacobsson et al. ......... | 280/730.2 |
| 7,770,918 B2 * | 8/2010 | Berntsson et al. ......... | 280/730.2 |
| 2004/0007857 A1 * | 1/2004 | Sonnenberg et al. ...... | 280/730.2 |
| 2006/0061071 A1 * | 3/2006 | Noguchi et al. ........... | 280/730.2 |
| 2006/0119084 A1 * | 6/2006 | Coon et al. ................ | 280/730.2 |
| 2006/0197316 A1 * | 9/2006 | Watanabe ................... | 280/728.2 |
| 2007/0296189 A1 * | 12/2007 | Berntsson et al. ......... | 280/730.2 |

FOREIGN PATENT DOCUMENTS

| | | |
|---|---|---|
| DE | 10331133 | 1/2004 |
| DE | 102005011676 | 11/2006 |
| EP | 0980769 | 2/2000 |
| EP | 1637408 | 3/2006 |

OTHER PUBLICATIONS

PCT/EP2007/010847 Initial Publication with International Search Report.

* cited by examiner

*Primary Examiner* — Paul N Dickson
*Assistant Examiner* — Drew Brown
(74) *Attorney, Agent, or Firm* — Brinks Hofer Gilson & Lione

(57) ABSTRACT

A curtain airbag to be installed in the roof frame area of a motor vehicle. The curtain airbag has an airbag skin including two side walls connected by an edge region, wherein the airbag skin surrounds a gas chamber. The gas chamber includes at least one protective area and at least one guide chamber fluidly connected to the protective area wherein the guide chamber is inflatable between the protective area and an internal structure of the motor vehicle when the curtain airbag is in an installed state. Furthermore, a plurality of fixing devices are provided for connecting the curtain airbag to the internal structure of the motor vehicle, wherein at least one guide chamber fixing device is located in the area of guide chamber in order to achieve a high level of operational safety and easy installation.

7 Claims, 3 Drawing Sheets

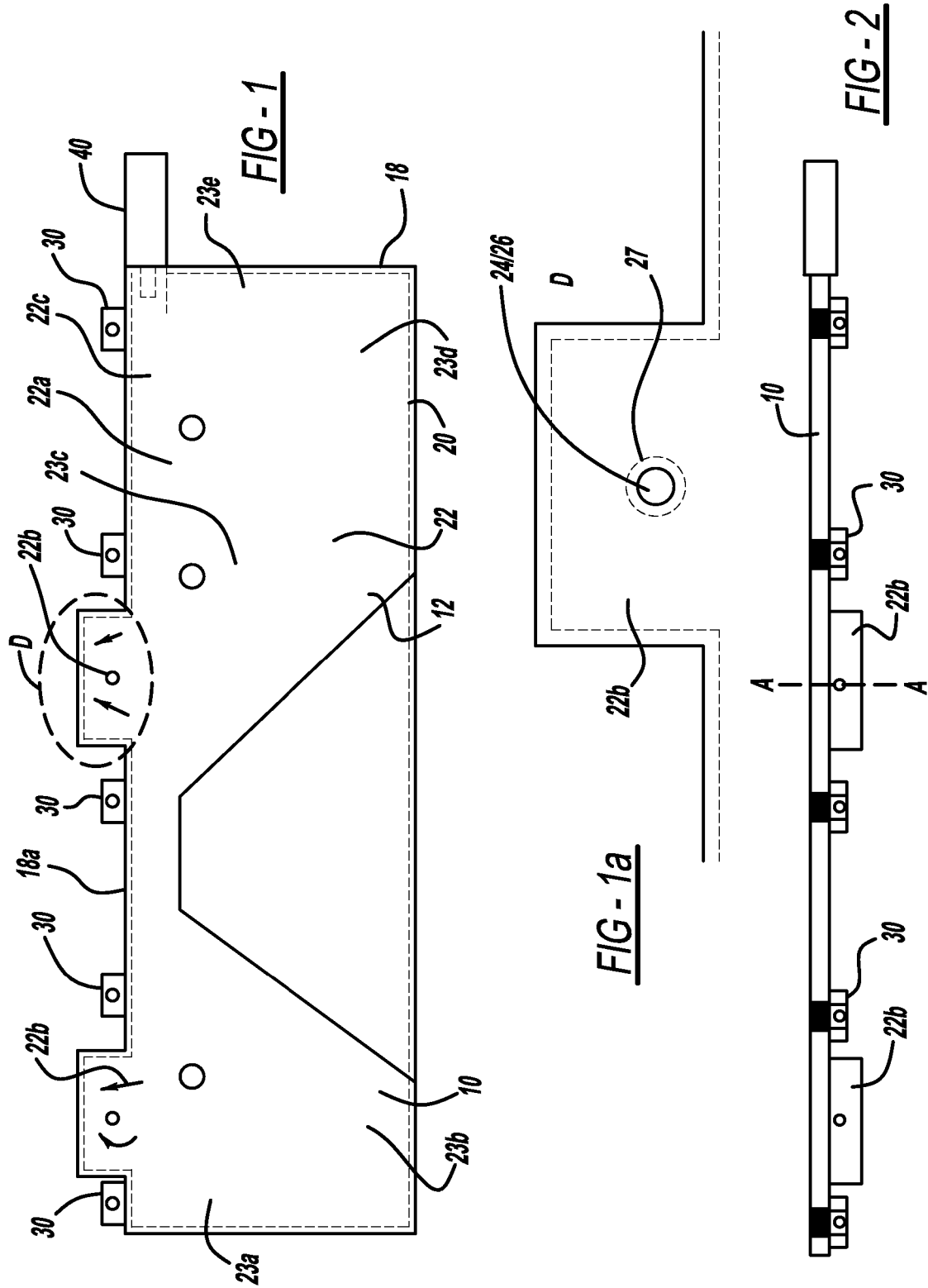

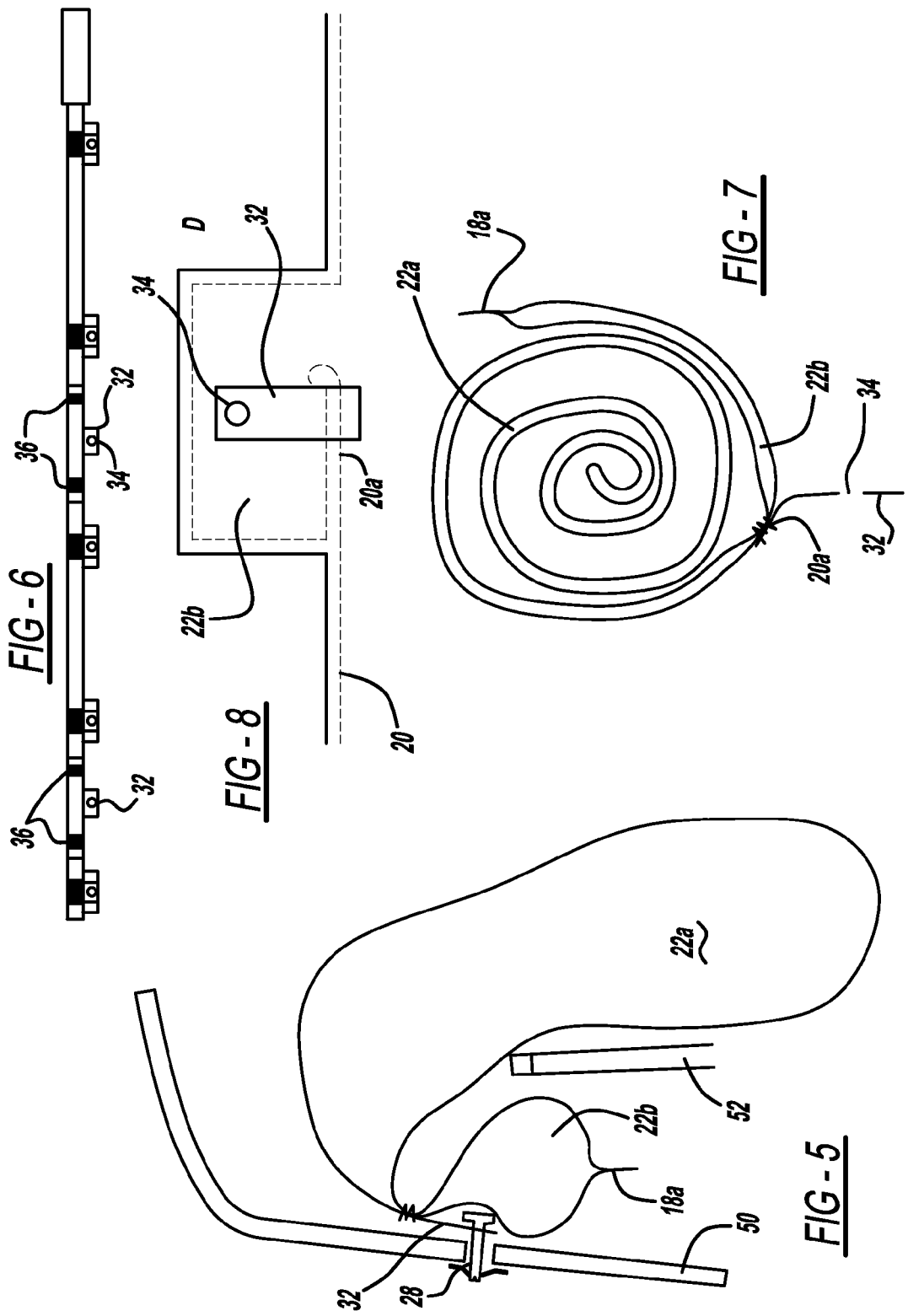

SIDE CURTAIN AIRBAG

CROSS REFERENCE TO RELATED APPLICATION

This application claims priority to International Application No. PCT/EP2007/010847, filed Dec. 12, 2007, which is based on and claims priority to German Patent Application No. 10 2006 061 968.4, filed Dec. 21, 2006.

FIELD OF THE INVENTION

The invention relates to a curtain airbag for a motor vehicle.

BACKGROUND OF THE INVENTION

A curtain airbag of the generic type is disclosed in DE 10 2005 011 676 A1. Such a curtain airbag is installed in the roof rail or frame area of a motor vehicle and serves to protect a vehicle occupant in case of a side impact or in case of a rollover. Such a curtain airbag has an airbag skin, which exhibits two side walls connected by means of an edge region, whereby the airbag skin encloses a gas chamber. This gas chamber is divided into at least one protective area (i.e., an inflatable area which serves for the protection of the occupants) which is positioned in such a way that a vehicle occupant can impact against it, and at least one guide chamber which is in fluid communication with the protective area. Such a guide chamber is located in the area of a pillar, in particular a B pillar or a C pillar, and in an installed state, the guide chamber prevents the curtain airbag from being caught in a hollow space (which is often present between the pillar trim and the vehicle side structure) during expansion of the protective area.

Retaining means such as mounting links or fixing lugs, which are located on the top edge of the airbag skin, serve to secure the curtain airbag in the roof rail area of the motor vehicle. Two variants are described in DE 10 2005 011 676 A1 with regard to the arrangement of such retaining means: in one variant, no mounting link is located on the guide chambers themselves, but only on the left and right of the respective guide chamber. In the other variant, a mounting link is located on the top edge of one of the guide chambers.

Both variants can be disadvantageous in some cases: if a fixing device is not directly assigned to a guide chamber, it cannot be ensured in all installation situations that the guide chamber positions itself as desired in the hollow space between the trim and the internal structure of the motor vehicle. If a fixing device in the form of a fixing lug or mounting link is located on the top edge of the guide chamber, installation is often difficult, particularly if the curtain airbag is fixed in the vehicle as described in DE 10 2005 011 676 A1, namely with the top edge downwards.

SUMMARY OF THE INVENTION

Accordingly, there is a need for a curtain airbag of the generic type which is easy to install and provides a high level of operational safety.

According to the present invention, a guide chamber fixing device is assigned to at least one guide chamber and is located at the height of the gas chamber. Thus, this guide chamber fixing device is not located in the edge region. As described below, there are basically two possibilities for forming the guide chamber fixing device.

In a first embodiment, the guide chamber fixing device exhibits a through-hole in each side wall, whereby these two through-holes lie above each other. In the installed state, a fixing element such as, but not limited to, a screw or a clip, for example, extends through the two through-holes through the airbag skin and through the guide chamber into the internal structure of the motor vehicle. In order to prevent gas leakage, a closed seam is preferably present, which surrounds the two through-holes and connects the two side walls.

In a second embodiment, a retaining device such as a lug is fixed (e.g., sewn or bonded) to the side wall pointing in the direction of the interior vehicle structure. The fixing point of this lug is at the height of the guide chamber and the end of the lug facing away from the fixing point may included a hole, through which a screw, a clip, or other similar fastening mechanism known in the art extends in the installed state.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

Various embodiments of the present invention will now be described in more detail below with reference to the following drawings.

FIG. 1 is a plan view of a curtain airbag in its unfolded state,
FIG. 1a is an exploded view of section D from FIG. 1,
FIG. 2 shows the curtain airbag of FIG. 1 in its rolled state as a package,
FIG. 5 shows a curtain airbag in its installed and expanded state according to a second embodiment of the invention,
FIG. 6 shows an airbag unit with a rolled curtain airbag according to the second embodiment of the invention,
FIG. 7 is a section view taken along Line B-B from FIG. 6,
and
FIG. 8 is view of FIG. 1a according to an alternative embodiment of the invention showing the fixing between an additional fixing lug and an airbag skin.

DETAILED DESCRIPTION OF THE INVENTION

Figure 3:
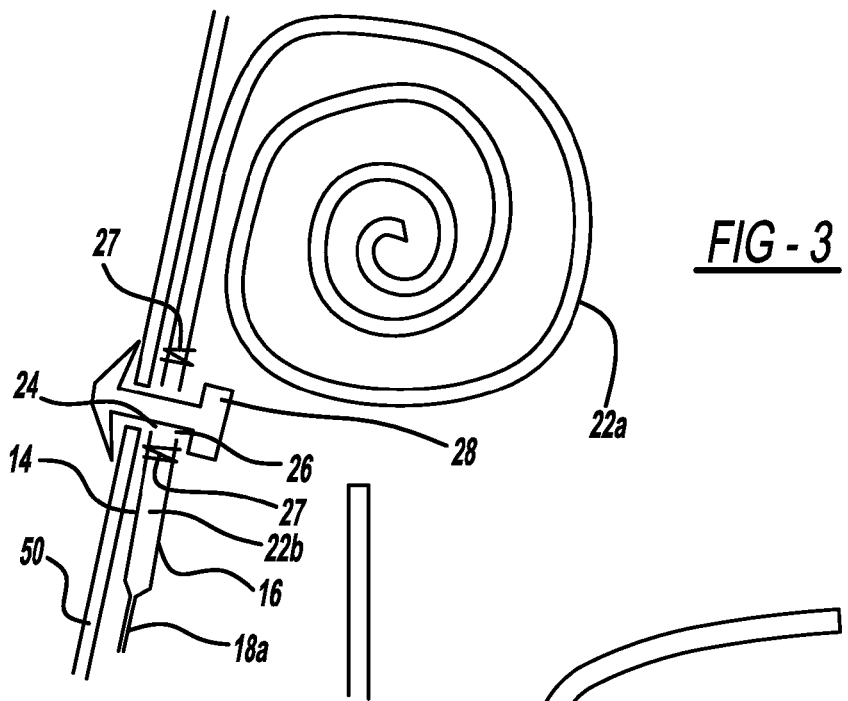
FIG. 3 is a section view taken along Line A-A from FIG. 2 in an installed state.

FIGS. 1 to 3 show a curtain airbag unit embodying the principles of the present invention. The curtain airbag unit comprises a curtain airbag 10 and a gas generator 40. According to a first embodiment, the gas generator is located at a side end of curtain airbag 10. Curtain airbag 10 has an airbag skin 12, which in turn exhibits two side walls 14,16 (see FIG. 3) connected with each other in an edge region 18 by means of a circumferential seam 20. Airbag skin 12 surrounds a gas chamber 22, which is divided into a protective area 22a, two guide chambers 22b, and a filling chamber 22c, whereby the filling chamber is located between protective area 22a and guide chambers 22b. In this embodiment, protective area 22a is divided into several chambers, 23a, 23b, 23c, 23d, and 23e. A first set of fixing devices in the form of fixing lugs 30 are located on an upper edge area 18a, wherein the fixing lugs 30 are configured to fix curtain airbag 10 to the internal structure of a motor vehicle.

A guide chamber fixing device is also assigned to each of the two guide chambers 22b. The construction of the guide chamber fixing devices will now be discussed in accordance with one aspect of the present invention. The two side walls 14,16 each exhibit a through-hole 24, 26 in the area of guide chamber 22b, whereby these through-holes lie above each other. Circular sealing seam 27 extends around the two through-holes 24, 26 (only shown in FIGS. 1a and 3). In the fastened state, as shown in FIG. 3, a fixing clip 28 such as a screw or the like extends through the two side walls 14,16, and therefore also through guide chamber 22b, into a corresponding opening of an internal structure 50 of a vehicle.

Figure 4:
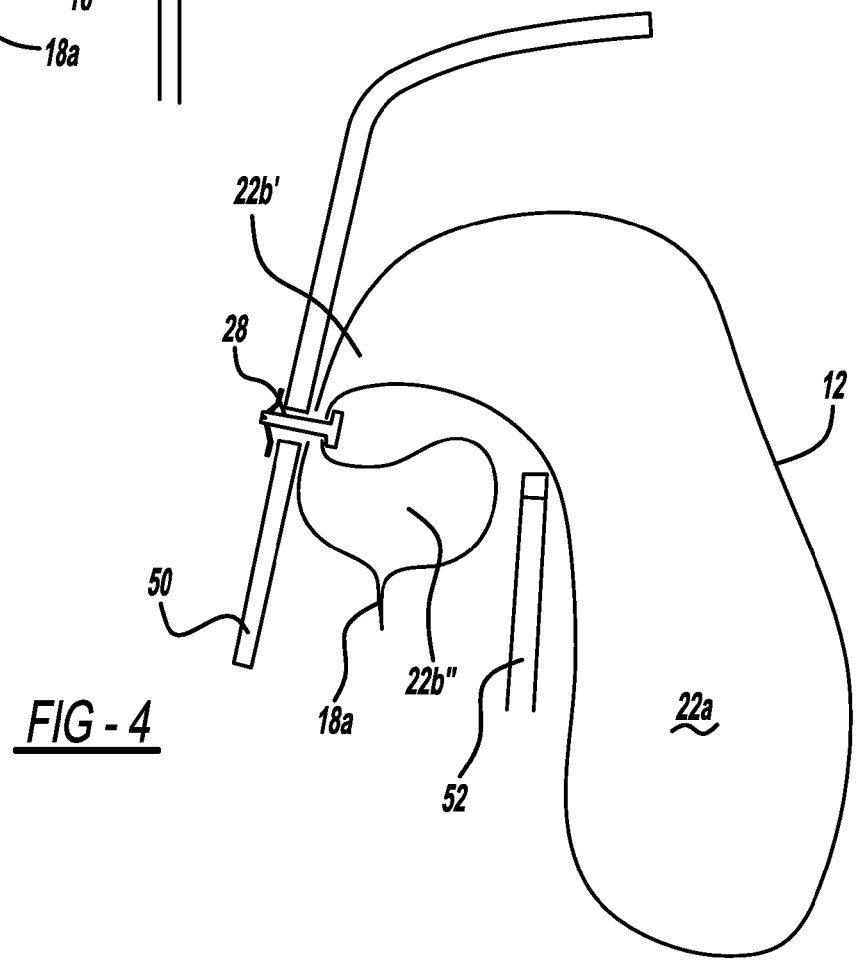
FIG. 4 shows the curtain airbag of FIG. 3 in its installed and expanded state.

As shown in FIG. 4, if gas chamber 22 is filled with gas, guide chamber 22b is divided into an upper section 22b' and a lower section 22b". Among other things, this has the consequence that the lower section, which is located between trim element 52 and internal vehicle structure 50, is very precisely positioned, which leads to a desired level of high operational safety.

Filling of this lower section of the guide chamber occurs around seam 27, as indicated in FIG. 1.

Installation is also very simple, as can be seen in FIG. 2, for example, as all fixing elements basically lie at uniform one height.

FIG. 5 shows an alternative embodiment of the invention in a view corresponding to FIG. 4. Here, an additional fixing lug 32 serves as guide chamber fixing device, which is sewn together with side walls 14,16 on the side which faces towards the internal structure of the vehicle when it is in its installed state. This is achieved by means of a fixing or connecting seam 20a. Connecting seam 20a is located in the transitional area between guide chamber 22b and filling chamber 22c. The end of the additional fixing lug 32 facing away from connecting seam 20a exhibits a hole 34, through which a clip 28 (or other fastening device known to those of ordinary skill in the art, such as, but not limited to a screw) also extends, so analogous to the previous embodiment, guide chamber 22b is very precisely positioned.

As can be seen from FIG. 8, connecting seam 20a is a section of circumferential seam 20, which runs into the transitional area between guide chamber 22b and filling chamber 22c, and connects the two side walls with each other. Accordingly, the fixing seam 20a not only serves to fix the additional fixing lug 32, but also serves as a division between guide chamber 22b and filling chamber 22c in some sections. Analogous to the first embodiment, this connection of the two side walls 14,16 in some sections improves the function of the guide chamber.

The foregoing embodiment with an additional lug for positioning the guide chamber is particularly preferred if the guide chamber—by means of one or several retaining tapes 36, for example—is laid against the airbag rolled or folded into a package as can be seen in FIGS. 6 and 7, whereby the representation in FIG. 6 corresponds to FIG. 2 and FIG. 7 is a section view taken along Line B-B in FIG. 6. The additional fixing lug can be directed upwards or downwards. Correspondingly, the fixing position of the additional fixing lugs on the internal structure of the vehicle would be located above or below protective area 22a rolled or folded together to form a package.

As can be seen from the Figures, the curtain airbag is arranged in the motor vehicle in such a way that its upper edge faces downwards. This arrangement is independent of whether the additional fixing lugs face upwards or downwards.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A curtain airbag to be installed in a roof frame area of a motor vehicle, the curtain airbag comprising:
    an airbag skin having a first side wall and a second side wall connected via an edge region, the airbag skin surrounding a gas chamber, wherein the gas chamber includes at least one protective area in fluid communication with at least one guide chamber;
    at least one guide chamber fixing device disposed in an area of the at least one guide chamber, the at least one guide chamber fixing device being located at a height of the gas chamber and being attached to the guide chamber via a connecting seam that serves as a division between the guide chamber and the protective area; and
    a plurality of fixing devices for securing the curtain airbag to an internal structure of the motor vehicle;
    wherein the curtain airbag is inflatable between the protective area and the internal structure of the motor vehicle when the curtain airbag is in an installed state.

2. The curtain airbag according to claim 1, wherein the guide chamber fixing device includes a fixing lug fixed to the first side wall, the fixing lug facing in a direction of the internal vehicle structure.

3. The curtain airbag according to claim 2, the connecting seam connecting the first side wall and the second side wall together.

4. The curtain airbag according to claim 3, wherein the connecting seam is a section of a circumferential seam, the circumferential seam connecting the first side wall and the second side wall together in the edge region.

5. The curtain airbag according to claim 1, wherein the guide chamber fixing device includes a first through-hole and a second through-hole in the first side wall and the second side wall, respectively, and
    wherein the first through-hole and the second through-hole lie above each other.

6. The curtain airbag according to claim 5, wherein a sealing seam extends around the first through-hole and the second through-hole, and
    wherein the sealing seam connects the first side wall and the second side wall together.

7. A curtain airbag to be installed in a roof frame area of a motor vehicle, the curtain airbag comprising:
    an airbag skin having a first side wall and a second side wall connected via an edge region, the airbag skin surrounding a gas chamber, wherein the gas chamber includes at least one protective area in fluid communication with at least one guide chamber;
    at least one guide chamber fixing device attached to the at least one guide chamber by a connecting seam that extends into a transitional area located between the guide chamber and the protective area; and
    a plurality of fixing devices for securing the curtain airbag to an internal structure of the motor vehicle;
    wherein the curtain airbag is inflatable between the protective area and the internal structure of the motor vehicle when the curtain airbag is in an installed state.

\* \* \* \* \*